(12) United States Patent
Fujimoto et al.

(10) Patent No.: US 10,792,973 B2
(45) Date of Patent: Oct. 6, 2020

(54) BLOWER DEVICE FOR AIR-CONDITIONING OF VEHICLE

(71) Applicant: JAPAN CLIMATE SYSTEMS CORPORATION, Hiroshima (JP)

(72) Inventors: Kazumi Fujimoto, Hiroshima (JP); Toshiki Hakata, Hiroshima (JP)

(73) Assignee: JAPAN CLIMATE SYSTEMS CORPORATION, Hiroshima (JP)

(*) Notice: Subject to any disclaimer, the term of this patent is extended or adjusted under 35 U.S.C. 154(b) by 199 days.

(21) Appl. No.: 16/132,384

(22) Filed: Sep. 15, 2018

(65) Prior Publication Data

US 2019/0030986 A1    Jan. 31, 2019

Related U.S. Application Data

(63) Continuation of application No. PCT/JP2017/004221, filed on Feb. 6, 2017.

(30) Foreign Application Priority Data

Mar. 22, 2016 (JP) .................................. 2016-057185

(51) Int. Cl.
  B60H 1/00 (2006.01)
  F04D 25/08 (2006.01)
  (Continued)

(52) U.S. Cl.
  CPC ..... B60H 1/00521 (2013.01); B60H 1/00064 (2013.01); B60H 1/00428 (2013.01);
  (Continued)

(58) Field of Classification Search
  CPC ............ B60H 1/00521; B60H 1/00064; B60H 1/00471; B60H 1/00849; B60H 1/00428;
  (Continued)

(56) References Cited

U.S. PATENT DOCUMENTS 5,071,322 A * 12/1991 Maekawa ........... F04D 25/0606
  416/244 B
6,110,035 A    8/2000 Uemura
  (Continued)

FOREIGN PATENT DOCUMENTS

JP    2000-238521 A    9/2000
JP    2000-296710 A    10/2000
  (Continued)

OTHER PUBLICATIONS

International Search Report and Written Opinion for corresponding App. No. PCT/JP2017/004221, dated Apr. 11, 2017.

*Primary Examiner* — Jessica Yuen
(74) *Attorney, Agent, or Firm* — Renner, Otto, Boisselle & Sklar, LLP

(57) ABSTRACT

An inner peripheral water entry reducing portion and an outer peripheral water entry reducing portion are provided. The inner peripheral water entry reducing portion includes an inner peripheral wall portion surrounding an output shaft. The outer peripheral water entry reducing portion includes an outer peripheral wall portion surrounding the inner peripheral wall portion. At least one inner peripheral opening of the inner peripheral water entry reducing portion and at least one outer peripheral opening of the outer peripheral water entry reducing portion are prevented from overlapping with each other in a circumferential direction of the output shaft.

3 Claims, 7 Drawing Sheets

(51) Int. Cl.
F04D 25/16 (2006.01)
F04D 29/42 (2006.01)
F04D 29/70 (2006.01)

(52) U.S. Cl.
CPC ..... *B60H 1/00471* (2013.01); *B60H 1/00849* (2013.01); *F04D 25/082* (2013.01); *F04D 25/166* (2013.01); *F04D 29/4246* (2013.01); *F04D 29/706* (2013.01); *F05D 2260/602* (2013.01)

(58) Field of Classification Search
CPC .. F04D 29/706; F04D 29/4246; F04D 25/166; F04D 25/082; F05D 2260/602
See application file for complete search history.

(56) References Cited

U.S. PATENT DOCUMENTS

| | | | |
|---|---|---|---|
| 6,142,864 | A | 11/2000 | Uemura |
| 6,321,870 | B1 | 11/2001 | Waronitza |
| 2012/0207593 | A1 | 8/2012 | Ochiai |
| 2016/0177970 | A1 | 6/2016 | Watanabe |

FOREIGN PATENT DOCUMENTS

| | | | |
|---|---|---|---|
| JP | 2001-206044 A | | 7/2001 |
| JP | 2011-201501 A | | 10/2011 |
| JP | 2012-166658 A | | 9/2012 |
| JP | 5556689 B | | 6/2014 |
| WO | 2015/025498 A1 | | 2/2015 |

* cited by examiner

REAR ←              → FRONT

BLOWER DEVICE FOR AIR-CONDITIONING OF VEHICLE

CROSS-REFERENCE TO RELATED APPLICATIONS

This is a continuation of International Application No. PCT/JP2017/004221 filed on Feb. 6, 2017, which claims priority to Japanese Patent Application No. 2016-057185 filed on Mar. 22, 2016. The entire disclosures of these applications are incorporated by reference herein.

BACKGROUND

The present invention relates to vehicle air-conditioning air blowers each mounted on an automobile, for example, to blow air-conditioning air, and more particularly relates to a structure capable of blowing air inside a cabin and air outside the cabin at the same time.

Typically, an air conditioner mounted on a vehicle selects either air inside a cabin (inside air) or air outside the cabin (outside air) to blow the selected air as air-conditioning air, and the blown air has its temperature controlled by a cooling heat exchanger and a heating heat exchanger, and is then fed to areas inside the cabin.

Recently commercialized vehicle air-conditioning air blowers for blowing air-conditioning air include a device that is switchable among an inside-air circulation mode in which only the inside air is blown, an outside-air introduction mode in which only the outside air is blown, and an inside/outside-air double flow mode in which both inside air and outside air are blown. That is to say, as disclosed in Japanese Unexamined Patent Publication No. 2000-296710, Japanese Unexamined Patent Publication No. 2001-206044, Japanese Unexamined Patent Publication No. 2011-201501, and Japanese Patent No. 5556689, a casing of a vehicle air-conditioning air blower has an inside air inlet, an outside air inlet, an upper air passage, and a lower air passage. The upper and lower air passages each include therein a blower fan. These two blower fans are driven by a common motor. The casing is provided with an inside/outside air switching damper for opening and closing the inside air inlet and the outside air inlet. The inside/outside air switching damper allows switching to be made among the inside-air circulation mode in which only the inside air inlet is opened, the outside-air introduction mode in which only the outside air inlet is opened, and the inside/outside-air double flow mode in which the inside air inlet and the outside air inlet are opened. If the two blower fans are rotated, and the inside-air circulation mode is selected, the inside air introduced through the inside air inlet flows through the upper and lower air passages. Alternatively, if the outside-air introduction mode is selected, the outside air introduced through the outside air inlet flows through the upper and lower air passages. Still alternatively, if the inside/outside-air double flow mode is selected, the outside air introduced through the outside air inlet flows through the upper air passage, and the inside air introduced through the inside air inlet flows through the lower air passage.

In Japanese Patent No. 5556689, an output shaft of a motor is disposed inside a casing to extend vertically. A cylindrical member is disposed to surround the output shaft.

SUMMARY

An air blower capable of selecting the inside/outside-air double flow mode as described in Japanese Unexamined Patent Publication No. 2000-296710, Japanese Unexamined Patent Publication No. 2001-206044, Japanese Unexamined Patent Publication No. 2011-201501, and Japanese Patent No. 5556689 has the following advantage. Specifically, selecting the inside/outside-air double flow mode during a heating operation, for example, allows low-humidity outside air introduced into an upper air passage to be supplied to the vicinity of a windshield to reduce fogging, and allows the inside air introduced into a lower air passage to circulate to the vicinity of passengers' feet to enhance the heating efficiency.

Since a casing of a vehicle air-conditioning air blower has an outside air inlet, rainwater outside the cabin and water used to wash the vehicle may enter the inside of the casing through the outside air inlet. The water that has entered the inside of the casing may flow through a lower air passage, and may flow toward the vicinity of an output shaft of a motor together with the air flow in the lower air passage at this time. In Japanese Patent No. 5556689, a cylindrical member surrounding the output shaft prevents water flowing toward the vicinity of the output shaft from entering the interior of the motor.

However, if the output shaft is surrounded by the cylindrical member as in Japanese Patent No. 5556689, the air in the lower air passage is less likely to flow toward the motor. This may degrade the capability to cool the motor.

In view of the foregoing background, it is therefore an object of the present invention to reduce water entering a motor that drives a blower fan, and to allow cooling air to be supplied to the motor, thereby enhancing the capability to cool the motor.

In order to achieve the object, according to the present invention, at least two overlapping walls for reducing water entry are provided around an output shaft of a motor. Inner and outer peripheral openings are prevented from overlapping with each other in a circumferential direction of the output shaft.

A first aspect of the present invention is directed to a vehicle air-conditioning air blower including:
  a casing having an inside air inlet through which air inside a cabin is introduced into the casing, and an outside air inlet through which air outside the cabin is introduced into the casing, the inside air inlet and the outside air inlet opening to outside, the casing further having a first air passage and a second air passage each communicating with both of the inside air inlet and the outside air inlet, the casing including an inside/outside air switching damper that opens and closes the inside air inlet and the outside air inlet;
  a first blower fan disposed in the first air passage;
  a second blower fan disposed in the second air passage; and
  a motor including an output shaft transmitting torque to the first and second blower fans, the first blower fan sending air in the first air passage as air-conditioning air, the second blower fan sending air in the second air passage as air-conditioning air, wherein
  the casing includes therein an inner peripheral water entry reducing portion including an inner peripheral wall portion, and an outer peripheral water entry reducing portion including an outer peripheral wall portion, the inner peripheral wall portion surrounding the output shaft and substantially preventing water inside the casing from entering the motor, the outer peripheral wall portion surrounding the inner peripheral wall portion outside the inner peripheral wall portion and substantially preventing water inside the casing from entering the motor, the inner peripheral water entry reducing portion has at least one inner peripheral opening through which air flows, the outer peripheral water entry reducing portion has at least one outer peripheral opening through which air flows, the at least one inner peripheral opening and the at least one outer peripheral opening are prevented from overlapping with each other in a circumferential direction of the output shaft.

Specifically, if the vehicle air-conditioning air blower operates in an outside-air introduction mode or an inside/outside-air double flow mode, the outside air inlet opens. Thus, water outside the cabin may enter the interior of the casing through the outside air inlet. The water that has entered the interior of the casing may flow toward the output shaft of the motor together with the air flow in the casing. According to the present invention, the inner peripheral wall portion of the inner peripheral water entry reducing portion and the outer peripheral wall portion of the outer peripheral water entry reducing portion surround the output shaft. Thus, at least the overlapping wall portions surround the output shaft. This substantially prevents water flowing toward the vicinity of the output shaft from entering the interior of the motor.

On the other hand, since the inner peripheral water entry reducing portion has the at least one inner peripheral opening, and the outer peripheral water entry reducing portion has the at least one outer peripheral opening, air flows through the at least one outer peripheral opening and the at least one inner peripheral opening, and reaches the vicinity of the output shaft. This allows cooling air to be supplied to the motor. At this time, water may join the flow of the air. However, the at least one inner peripheral opening and the at least one outer peripheral opening do not overlap with each other in the circumferential direction of the output shaft. Thus, even if water passes through the at least one outer peripheral opening, the water then hits the inner peripheral wall portion, and is less likely to reach the at least one inner peripheral opening. This substantially prevents water from entering the interior of the motor.

A second aspect of the present invention is an embodiment of the first aspect. In the second aspect, the first and second blower fans and the output shaft may be arranged so that their rotation axes extend vertically, the vehicle air-conditioning air blower may further include a lower wall portion connecting a lower portion of the inner peripheral wall portion and a lower portion of the outer peripheral wall portion together, the lower wall portion may be inclined downward toward outside in a radial direction of the output shaft, and the at least one outer peripheral opening may reach a lower end of the outer peripheral wall portion.

According to this configuration, if water in the casing enters a space between the inner peripheral wall portion and the outer peripheral wall portion through the at least one outer peripheral opening, the water flows downward to reach the lower wall portion, and then flows through the upper surface of the lower wall portion outward in the radial direction of the output shaft so as to be drained out of the at least one outer peripheral opening. Thus, even if water enters the space between the inner peripheral wall portion and the outer peripheral wall portion, the water is substantially prevented from being accumulated.

A third aspect of the present invention is an embodiment of the second aspect. In the third aspect, the at least inner peripheral opening and the at least one outer peripheral opening may be each configured as a slit extending vertically, the at least one inner peripheral opening may comprise a plurality of inner peripheral openings, the at least one outer peripheral opening may comprise a plurality of outer peripheral openings, the inner peripheral openings may be spaced apart from each other in the circumferential direction of the output shaft, and the outer peripheral openings may be spaced apart from each other in the circumferential direction of the output shaft.

According to this configuration, the inner and outer peripheral openings are each configured as a slit. Thus, water is less likely to pass through the inner and outer peripheral openings. In addition, since the at least one inner peripheral opening comprises a plurality of inner peripheral openings, and the at least one outer peripheral opening comprises a plurality of outer peripheral openings, a sufficiently large amount of air passes through these openings.

A fourth aspect of the present invention is an embodiment of the second aspect. In the fourth aspect, the first blower fan may be disposed above the second blower fan, the motor may be disposed below the second blower fan, an annular bell mouth portion having an air inlet for the second blower fan may be provided outside the outer peripheral wall portion, and the inner peripheral wall portion, the outer peripheral wall portion, and the bell mouth portion may be integrated together.

This configuration reduces the number of parts, thus reducing the number of assembling steps. In addition, the inner peripheral wall portion, the outer peripheral wall portion, and the bell mouth portion are prevented from being relatively misaligned. This improves the assembling accuracy.

A fifth aspect of the present invention is an embodiment of the fourth aspect. In the fifth aspect, a fixing portion fixed to the casing may be provided on an outer portion of the bell mouth portion.

According to this configuration, since the outer portion of the bell mouth portion is fixed to the casing, the inner peripheral wall portion, the outer peripheral wall portion, and the bell mouth portion are stabilized inside the casing.

A sixth aspect of the present invention is an embodiment of the fourth aspect. In the sixth aspect, a support leg portion supported by the motor may be provided on an outer portion of the bell mouth portion.

According to this configuration, the outer portion of the bell mouth portion is supported by the motor. Thus, the inner peripheral wall portion, the outer peripheral wall portion, and the bell mouth portion are stabilized inside the casing.

According to the first aspect of the invention, an inner peripheral water entry reducing portion and an outer peripheral water entry reducing portion are provided. The inner peripheral water entry reducing portion includes an inner peripheral wall portion surrounding an output shaft. The outer peripheral water entry reducing portion includes an outer peripheral wall portion surrounding the inner peripheral wall portion. At least one inner peripheral opening of the inner peripheral water entry reducing portion and at least one outer peripheral opening of the outer peripheral water entry reducing portion are prevented from overlapping with each other in a circumferential direction of the output shaft.

Thus, cooling air can be supplied to a motor while water entering the motor is reduced. This can improve the cooling performance of the motor.

According to the second aspect of the invention, a lower wall portion that connects a lower portion of the inner peripheral wall portion and a lower portion of the outer peripheral wall portion together is inclined downward toward the outside of the output shaft in the radial direction, and the at least one outer peripheral opening reaches the lower end of the outer peripheral wall portion. Thus, if water enters a space between the inner peripheral wall portion and the outer peripheral wall portion, the water can be drained.

According to the third aspect of the invention, the inner peripheral opening and the outer peripheral opening are each configured as a slit extending vertically, the at least one inner peripheral opening comprises a plurality of inner peripheral openings, the at least one outer peripheral opening comprises a plurality of outer peripheral openings, the inner peripheral openings are spaced apart from each other in the circumferential direction of the output shaft, and the outer peripheral openings are spaced apart from each other in the circumferential direction of the output shaft. Thus, a sufficiently large amount of air can pass through these openings while water passing through these openings is reduced.

According to the fourth aspect of the invention, the inner peripheral wall portion, the outer peripheral wall portion, and a bell mouth portion of a water entry reducing member are integrated together. This reduces the number of parts to reduce the number of assembling steps, and prevents the inner peripheral wall portion, the outer peripheral wall portion, and the bell mouth portion from being relatively misaligned, thus improving the assembling accuracy.

According to the fifth aspect of the invention, since an outer portion of the bell mouth portion can be fixed to a casing, the inner peripheral wall portion, the outer peripheral wall portion, and the bell mouth portion can be stabilized inside the casing.

According to the sixth aspect of the invention, since the outer portion of the bell mouth portion can be supported by the motor, the inner peripheral wall portion, the outer peripheral wall portion, and the bell mouth portion can be stabilized inside the casing.

DETAILED DESCRIPTION

Embodiments of the present invention will now be described in detail with reference to the drawings. The following description of preferred embodiments is only an example in nature, and is not intended to limit the scope, applications or use of the present invention.

Figure 1:
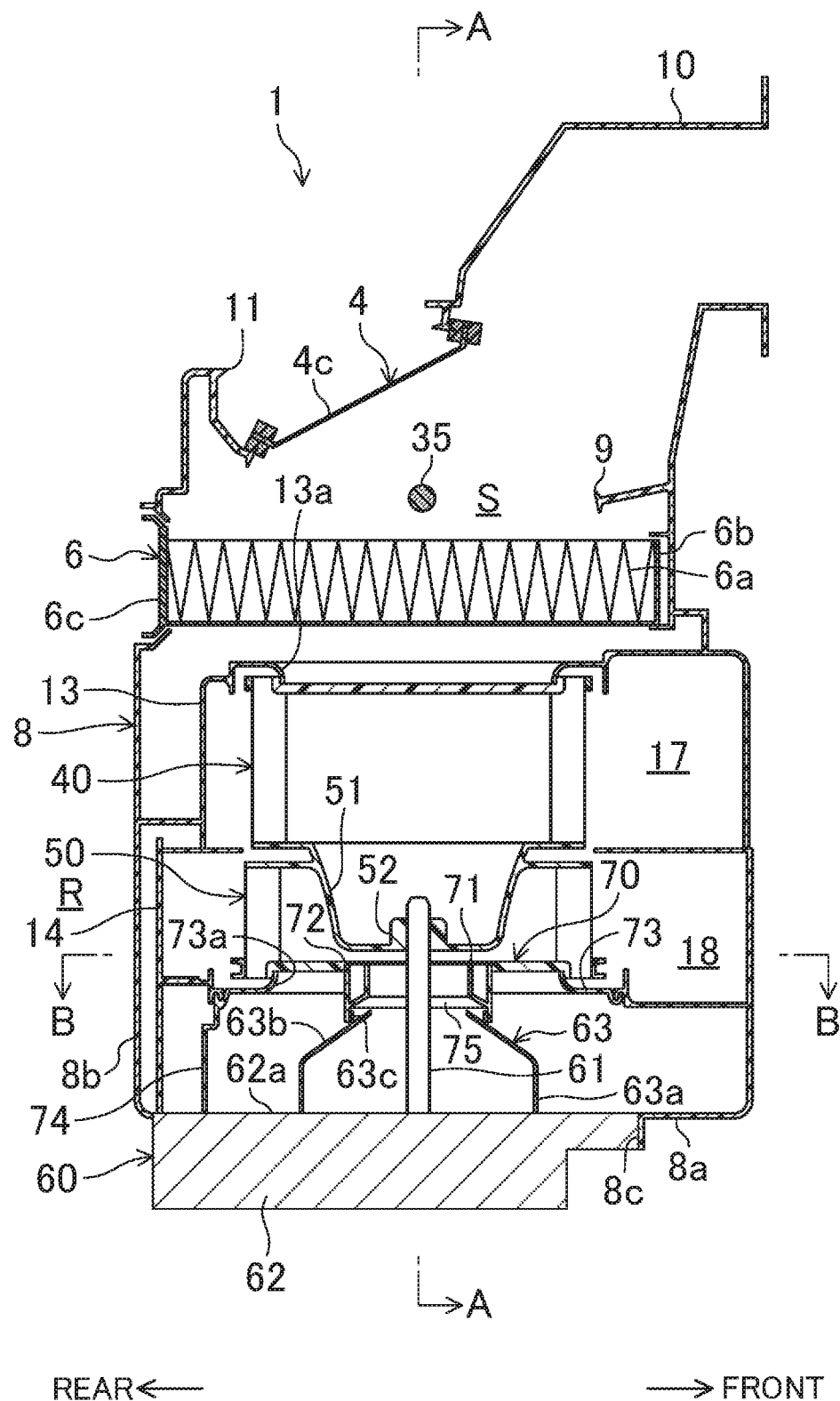
FIG. 1 is a longitudinal sectional view of a vehicle air-conditioning air blower according to a first embodiment.

FIG. 1 is a longitudinal sectional view of a vehicle air-conditioning air blower 1 according to an embodiment of the present invention. This vehicle air-conditioning air blower 1 is disposed in, for example, a cabin of an automobile to blow air-conditioning air, and forms a vehicle air conditioner together with an air conditioning unit (not shown). The air conditioning unit includes a cooling heat exchanger, a heating heat exchanger, an air mixing damper, a blowing direction switching damper, and an air-conditioning casing housing these components. Air-conditioning air blown from the vehicle air-conditioning air blower 1 is introduced into the air-conditioning casing, and passes through the cooling heat exchanger and the heating heat exchanger to generate air-conditioned wind having an intended temperature. Then, the air-conditioned wind is fed to areas inside the cabin in accordance with a blowout mode selected by the blowing direction switching damper. The temperature of the air-conditioned wind is adjusted by the amount of air which passes through the heating heat exchanger which is determined by the air mixing damper.

In the following description of this embodiment, the front, rear, left, and right sides of the vehicle will be simply referred to as the "front," "rear," "left," and "right," respectively.

The vehicle air-conditioning air blower 1 is housed in an instrument panel (not shown) arranged in a front end portion of a cabin of the vehicle together with the air conditioning unit. The air conditioning unit is disposed in a substantially laterally central portion of the interior of the instrument panel, while the vehicle air-conditioning air blower 1 is disposed inside the instrument panel on the passenger's side of the air conditioning unit (on the left side of the air conditioning unit in the case of a right-hand drive vehicle, or on the right side thereof in the case of a left-hand drive vehicle).

Figure 2:
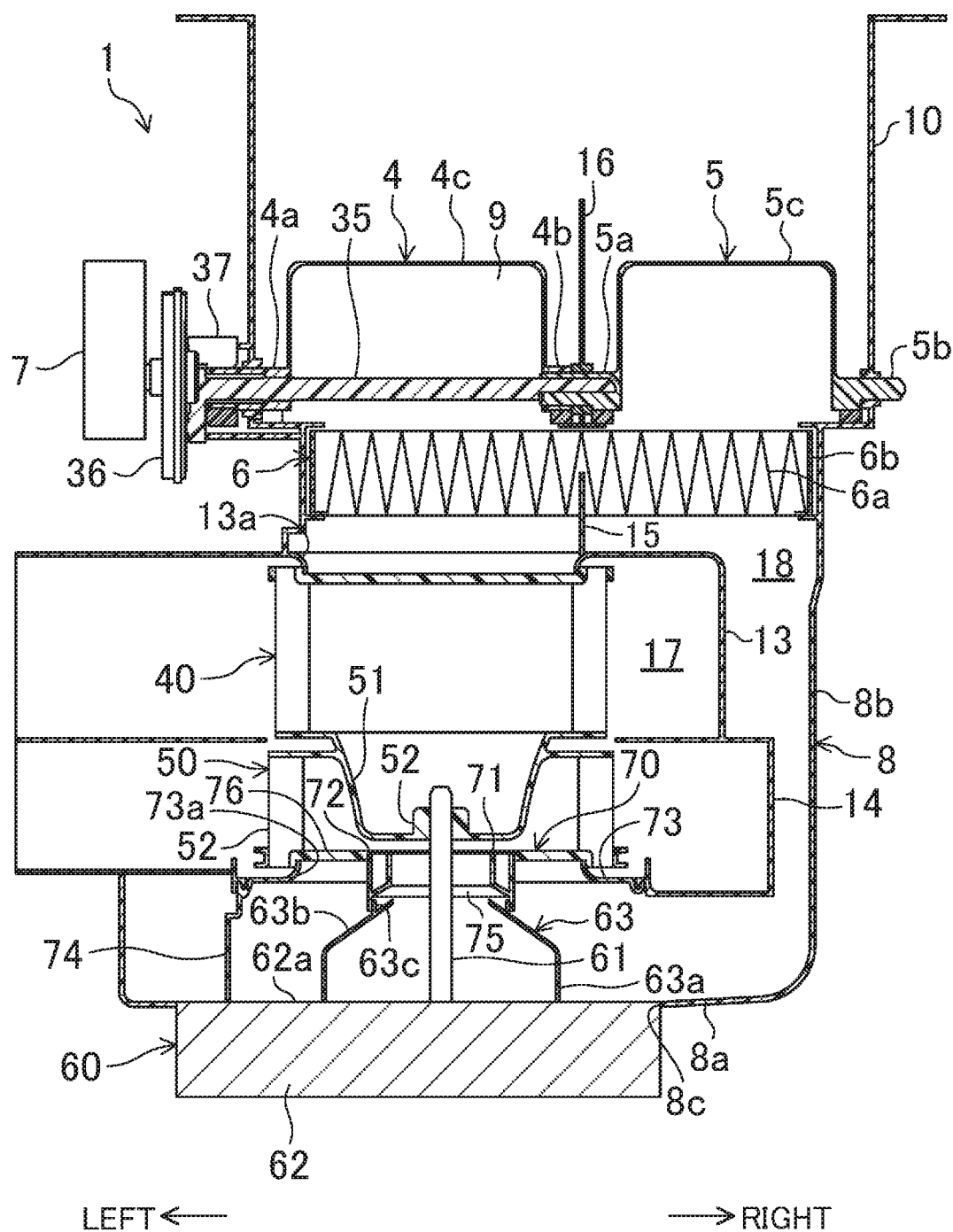
FIG. 2 is a cross-sectional view taken along line A-A shown in FIG. 1.

As shown also in FIG. 2, the vehicle air-conditioning air blower 1 includes an upper blower fan (a first blower fan) 40, a lower blower fan (a second blower fan) 50, a motor 60 for rotationally driving the blower fans 40 and 50, a first inside/outside air switching damper 4, a second inside/outside air switching damper 5, an air filter 6, an inside/outside air switching actuator 7, and a blowing casing 8.

The blowing casing 8 is formed by combining, for example, a plurality of resin members, and houses therein the upper blower fan 40, the lower blower fan 50, the first inside/outside air switching damper 4, the second inside/outside air switching damper 5, and the air filter 6. The upper blower fan 40 and the lower blower fan 50 each have a rotation axis extending vertically, and are vertically arranged. The upper blower fan 40 and the lower blower fan 50 may be integrated together, or may be formed as separate parts and combined together.

A front portion of an upper wall portion of the blowing casing 8 has an outside air inlet 9 through which air outside the cabin (outside air) is introduced into the blowing casing 8. The outside air inlet 9 opens to the outside of the blowing casing 8. A portion of the blowing casing 8 surrounding the outside air inlet 9 includes an outside air inlet duct 10 extending upward. The upstream end of the outside air inlet duct 10 is connected to a communication port (not shown) of a cowl of the vehicle body. That is to say, the outside air inlet 9 communicates with the outside of the cabin through the outside air inlet duct 10 and the communication port. The outside air inlet 9 can be laterally long.

A rear portion of the upper wall portion of the blowing casing 8 has an inside air inlet 11 opening to the outside of the blowing casing 8. The inside air inlet 11 is adjacent to the rear side of the outside air inlet 9. The inside air inlet 11 communicates with the interior of the cabin, and is used to introduce air (inside air) of the cabin into the blowing casing 8. The inside air inlet 11 can also be laterally long.

As shown in FIG. 1, a filter housing space S is formed as an upper portion of the internal space of a peripheral wall portion 8b of the blowing casing 8, and communicates with the outside air inlet 9 and the inside air inlet 11. The filter housing space S is provided with the filter 6. The filter 6 includes a pleated filter material 6a for air filtration, a frame member 6b surrounding the filter material 6a and integrated with the filter material 6a, and a lid 6c for closing a filter insertion portion of the blowing casing 8. The filter 6 is arranged in the filter housing space S to extend substantially horizontally, and is supported by an inner surface of the blowing casing 8.

An upper air passage (a first air passage) 17 and a lower air passage (a second air passage) 18 are formed inside the peripheral wall portion 8b of the blowing casing 8 and below the filter housing space S (downstream of the filter housing space S in an airflow direction). Specifically, a portion of the internal space of the peripheral wall portion 8b of the blowing casing 8 distant from the filter housing space S in a downward direction includes an upper scroll portion 13, and a lower scroll portion 14, which is downwardly adjacent to the upper scroll portion 13. The upper scroll portion 13 and the lower scroll portion 14 are positioned substantially concentrically. A lower wall portion of the upper scroll portion 13 serves also as an upper wall portion of the lower scroll portion 14.

The upper wall portion of the upper scroll portion 13 has an air inlet 13a for the upper blower fan 40. The air inlet 13a opens upward. As shown in FIG. 2, the air inlet 13a is located leftward of a laterally central portion of the internal space of the peripheral wall portion 8b of the blowing casing 8. A lower partition plate 15 projecting upward is provided on the right edge of the air inlet 13a. The lower partition plate 15 extends to the inside of the filter housing space S, and thus partitions the filter housing space S and a space downstream of the filter housing space S into two left and right subspaces.

An upper partition plate 16 is disposed inside the blowing casing 8 so as to be positioned on an extension of the lower partition plate 15 extending upward. The upper partition plate 16 partitions a space upstream of the filter housing space S in the airflow direction into two left and right subspaces.

A space on the left side of the lower partition plate 15 and the upper partition plate 16 is an upstream portion of the upper air passage 17. The upstream portion of this upper air passage 17 extends to the air inlet 13a. A downstream portion of the upper air passage 17 extends from the air inlet 13a to the inside of the upper scroll portion 13, extends in the circumferential direction inside the upper scroll portion 13, and then extends leftward.

A space on the right side of the lower partition plate 15 and the upper partition plate 16 is the lower air passage 18. As shown also in FIG. 2, an upstream portion of the lower air passage 18 extends downward between a combination of the outer surfaces of the upper scroll portion 13 and the lower scroll portion 14 and the inner surface of the peripheral wall portion 8b of the blowing casing 8, and reaches a bottom wall portion 8a of the blowing casing 8. That is to say, the lower air passage 18 extends to below the upper air passage 17. The upstream portion of the lower air passage 18 extends to a lower bell mouth 73.

A downstream portion of the lower air passage 18 extends from the lower bell mouth 14a to the inside of the lower scroll portion 14, extends in the circumferential direction inside the lower scroll portion 14, and then extends leftward. The downstream portion of the lower air passage 18 is located under the downstream portion of the upper air passage 17.

In this embodiment, the upper blower fan 40 and the lower blower fan 50 are made of a resin material and integrated together. The upper blower fan 40 is a centrifugal fan, and has a rotation axis extending vertically inside the upper scroll portion 13 (i.e., inside the upper air passage 17). The rotating upper blower fan 40 expels air drawn from above the fan radially outward.

As shown in FIGS. 1 and 2, the lower blower fan 50 is a centrifugal fan, and has a rotation axis extending vertically inside the lower scroll portion 14 (i.e., inside the lower air passage 18). The rotating lower blower fan 50 expels air drawn from below the fan radially outward.

Figure 3:
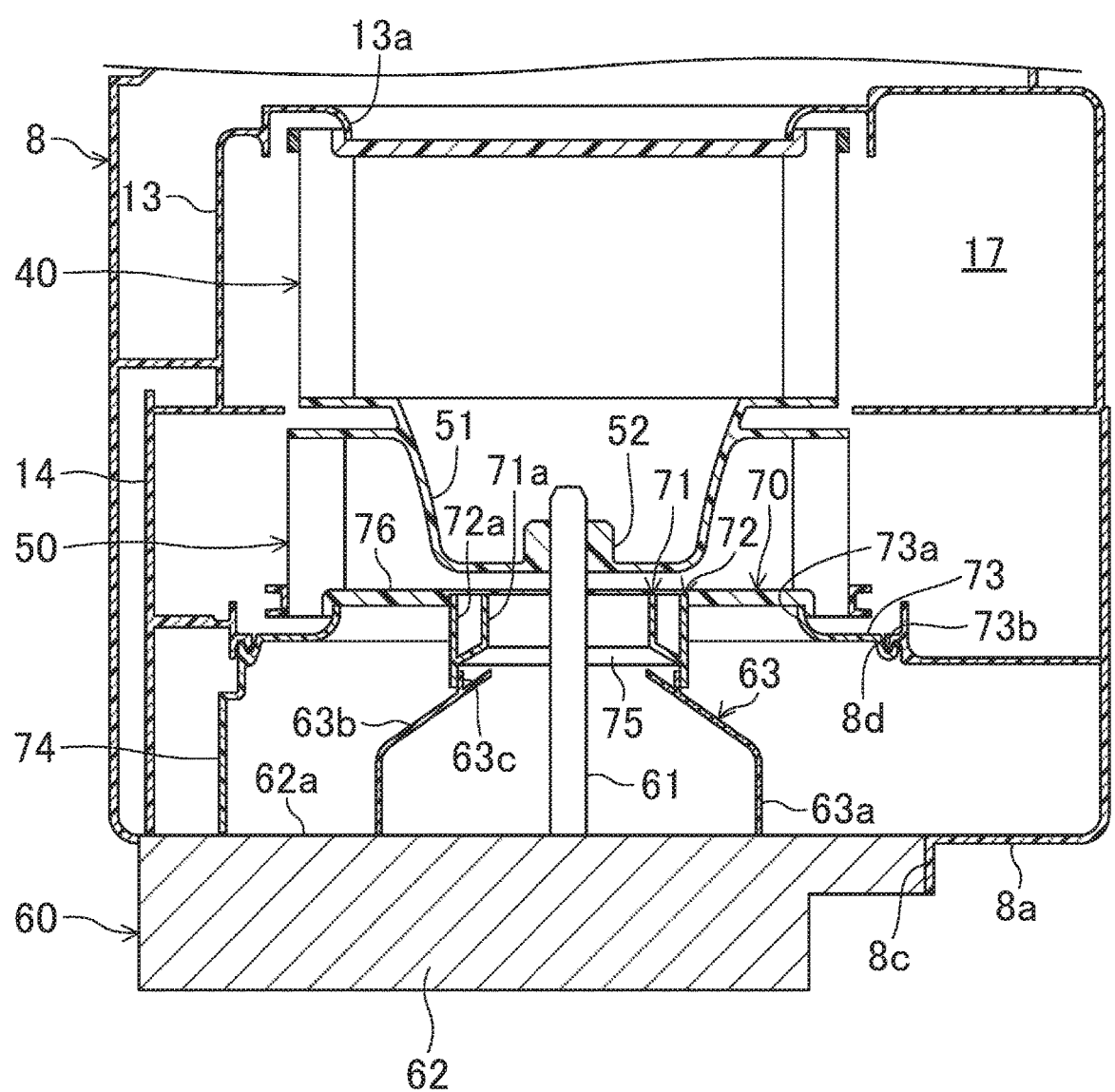
FIG. 3 is an enlarged view of a lower portion of the vehicle air-conditioning air blower shown in FIG. 1.

As shown in FIG. 3, a circular plate portion 51 is provided inside the lower blower fan 50. The circular plate portion 51 is formed so that the rotation center of the lower blower fan 50 is located at the lowermost position, and is curved so as to be inclined gradually upward as the point of interest comes closer to the periphery of the circular plate portion 51.

A central portion of the circular plate portion 51 of the lower blower fan 50 is provided with a boss portion 52 projecting upward and having openings at both ends thereof. An output shaft 61 of the motor 60 is coupled to the boss portion 52 while being inserted into the boss portion 52. The boss portion 52 and the output shaft 61 are integrated together so that the torque of the motor 60 is transmitted through the output shaft 61 to the upper blower fan 40 and the lower blower fan 50.

The first and second inside/outside air switching dampers 4 and 5 shown in FIG. 2 operate independently, and are both rotary dampers, each of which opens and closes the outside air inlet 9 and the inside air inlet 11. The first inside/outside air switching damper 4 is disposed upstream of the upper air passage 17. Opening and closing the outside air inlet 9 and the inside air inlet 11 allows either only outside air or only inside air, or both, which is/are optionally selected, to flow into the upper air passage 17. The second inside/outside air switching damper 5 is disposed upstream of the lower air passage 18. Opening and closing the outside air inlet 9 and the inside air inlet 11 allows either only outside air or only inside air, or both, which is/are optionally selected, to flow into the lower air passage 18.

Specifically, a left end portion of the first inside/outside air switching damper 4 is provided with a left cylindrical portion 4a, and a right end portion thereof is provided with a right cylindrical portion 4b. The left cylindrical portion 4a and the right cylindrical portion 4b extend laterally, and are positioned concentrically. A portion of the first inside/outside air switching damper 4 between the left cylindrical portion 4a and the right cylindrical portion 4 is configured as a closing plate portion 4c, which extends laterally to connect the left cylindrical portion 4a and the right cylindrical portion 4b together. The left cylindrical portion 4a and the right cylindrical portion 4b are pivotably supported by the blowing casing 8. Thus, the closing plate portion 4c pivots forward or rearward around its center line extending laterally.

As shown in FIG. 1, when the closing plate portion 4c pivots rearward, the outside air inlet 9 is fully opened, and the inside air inlet 11 is fully closed. Thus, the vehicle air-conditioning air blower 1 enters into an outside-air introduction mode in which only outside air is introduced thereinto. On the other hand, although not shown, when the closing plate portion 4c pivots forward, the outside air inlet 9 is fully closed, and the inside air inlet 11 is fully opened. Thus, the vehicle air-conditioning air blower 1 enters into an inside-air circulation mode in which only inside air is introduced thereinto. If the first inside/outside air switching damper 4 opens the outside air inlet 9, and the second inside/outside air switching damper 5 opens the inside air inlet 11, the vehicle air-conditioning air blower 1 enters into an inside/outside-air double flow mode in which outside air and inside air are introduced thereinto.

As shown in FIG. 2, the left cylindrical portion 4a penetrates the peripheral wall portion 8b of the blowing casing 8, and projects outward. The driving force of the inside/outside air switching actuator 7 is transmitted through a transmission member 37 to the left cylindrical portion 4a so that the first inside/outside air switching damper 4 pivots.

The second inside/outside air switching damper 5 basically has the same or similar configuration as/to the first inside/outside air switching damper 4, and includes a left shaft portion 5a extending leftward, a right shaft portion 5b extending rightward, and a closing plate portion 5c. The closing plate portion 5c pivots forward or rearward around its center line extending laterally. The left shaft portion 5a and the right shaft portion 5b are pivotably supported by the blowing casing 8. A right end portion of a drive shaft 35 extending laterally is coupled to the left shaft portion 5a so that the drive shaft 35 cannot rotate relative to the left shaft portion 5a. The driving force of the inside/outside air switching actuator 7 is transmitted through a link member 36 to the drive shaft 35. This allows the second inside/outside air switching damper 5 to pivot. The driving force is transmitted separately to the first and second inside/outside air switching dampers 4 and 5. This transmission is achieved by, for example, a well-known linkage. Further, the first and second inside/outside air switching dampers 4 and 5 can also be driven by separate actuators.

The bottom wall portion 8a of the blowing casing 8 has a motor attachment hole 8c. The motor attachment hole 8c communicates with the inside of the blowing casing 8.

Figure 4:
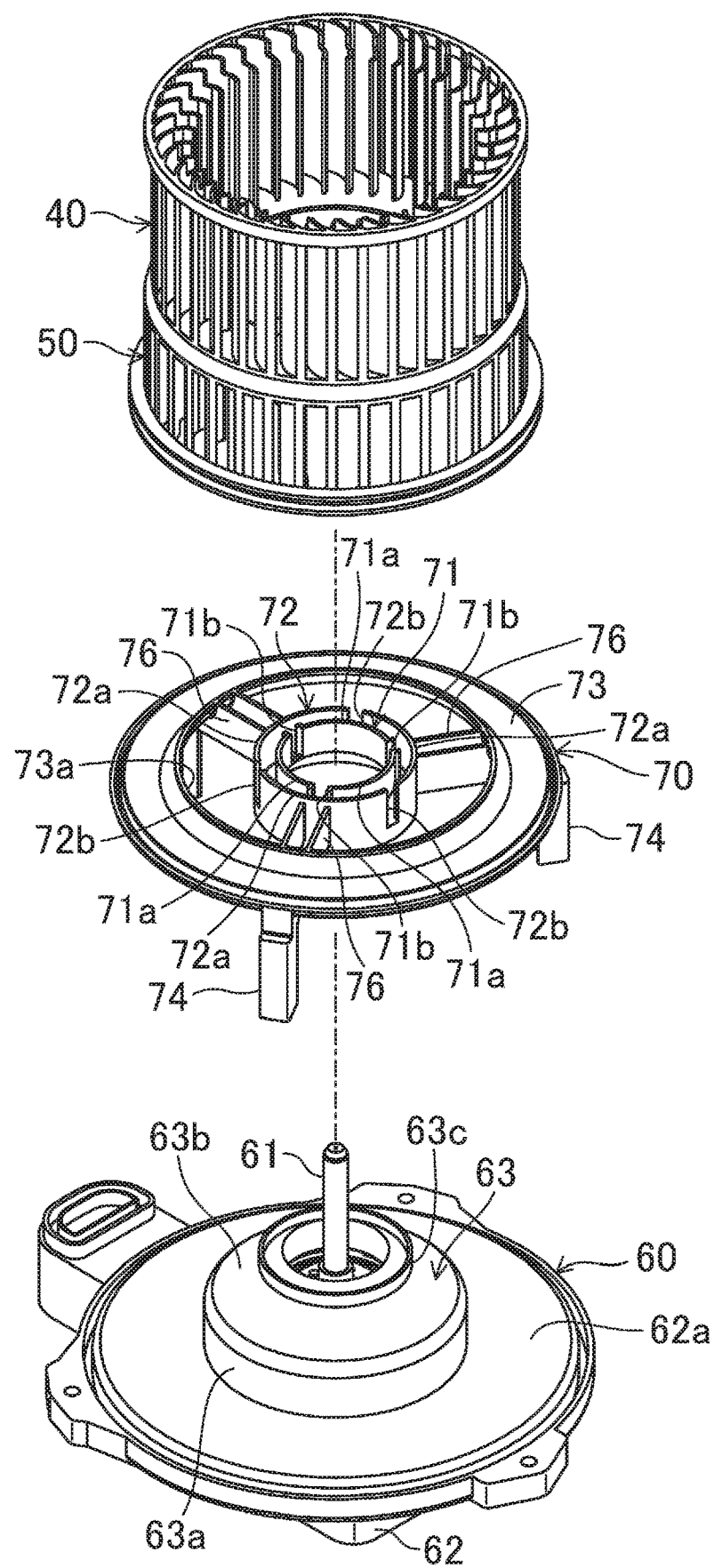
FIG. 4 is an exploded perspective view of a motor, a blower fan, and a water entry reducing member.

As shown also in FIG. 4, the motor 60 includes the output shaft 61, a body 62, and a cover 63. The body 62 has a substantially plate-like shape, and includes therein a rotor, a stator, and other components. The body 62 is fixed to the blowing casing 8 by a fastening member or any other suitable member while being inserted into the motor attachment hole 8c of the blowing casing 8. An upper surface 62a of the body 62 faces the inside of the blowing casing 8, and extends substantially horizontally.

The output shaft 61 protrudes upward from a central portion of the body 62. The cover 63 is fixed to the upper surface 62a of the body 62, and extends while surrounding the output shaft 61. An upper portion of the cover 63 is positioned below an upper portion of the output shaft 61. Thus, the output shaft 61 projects upward beyond the upper portion of the cover 63, and the boss portion 52 is connected to a portion of the output shaft 61 projecting upward beyond the cover.

A substantially lower half portion of the cover 63 is configured as a cylindrical portion 63a extending vertically. The center line of the cylindrical portion 63a substantially coincides with the center line of the output shaft 61. The cylindrical portion 63a of the cover 63 has an upper end portion provided with a tapered portion 63b. The tapered portion 63b extends while being inclined radially inward toward the upper end of the tapered portion 63b. A gap is formed between the upper end of the tapered portion 63b and the outer surface of the output shaft 61. This gap is used to introduce cooling air therethrough. The tapered portion 63b is provided with a protrusion 63c protruding upward and extending in a ring shape. The protrusion 63c is formed at a vertically intermediate portion of the outer surface of the tapered portion 63b. The center line of the protrusion 63c substantially coincides with the center line of the output shaft 61.

Figure 5:
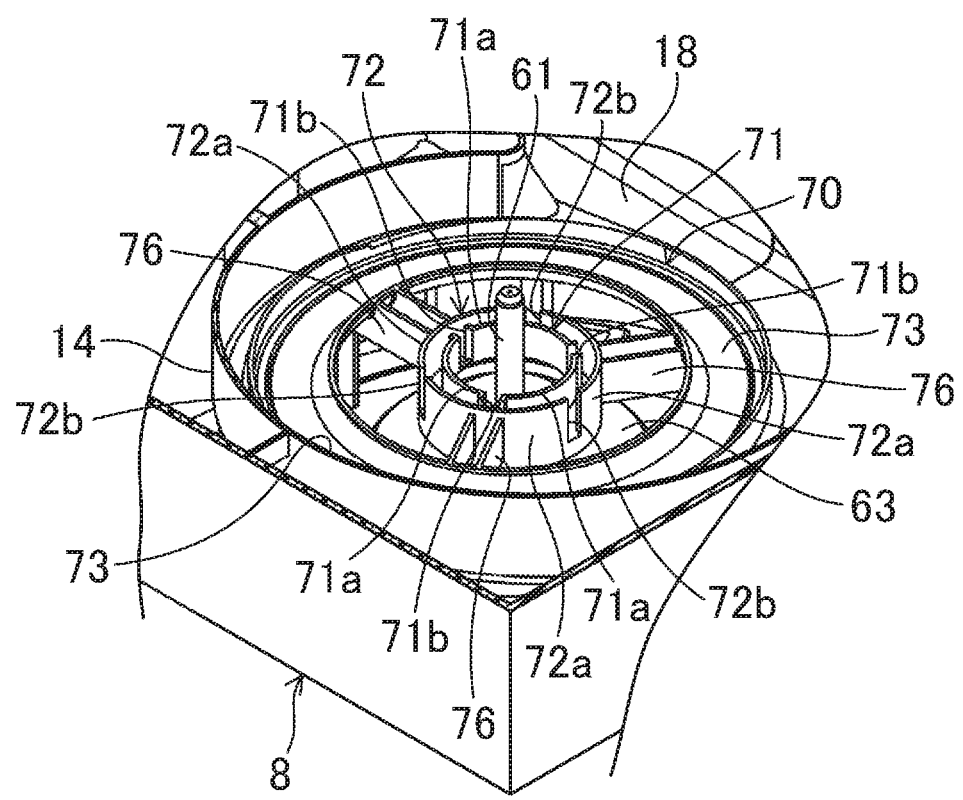
FIG. 5 is a cross-sectional view taken along line B-B shown in FIG. 1 as viewed obliquely, and illustrates a state in which the blower fan is omitted.

As shown in FIGS. 3, 5, and other figures, the blowing casing 8 includes therein a water entry reducing member 70 for reducing water entering the interior of the motor 60. The water entry reducing member 70 is made of a resin material or any other suitable material, and includes an inner peripheral water entry reducing portion 71, an outer peripheral water entry reducing portion 72, a ring-shaped bell mouth portion 73, and support leg portions 74. The inner peripheral water entry reducing portion 71 includes three inner peripheral wall portions 71a, 71a, 71a surrounding the output shaft 61 and substantially preventing water inside the blowing casing 8 from entering the interior of the motor 60, and inner peripheral openings 71b each formed between an associated adjacent pair of the inner peripheral wall portions 71a. Each inner peripheral wall portion 71a extends in an arc shape around the output shaft 61. The total number of the inner peripheral openings 71b is three. Each inner peripheral opening 71b is formed in the shape of a slit elongated vertically, and extends from the upper end to the lower end of the inner peripheral wall portion 71a. The inner peripheral openings 71b, 71b, 71b are spaced apart from each other in the circumferential direction of the output shaft 61. Furthermore, a projection 71c (shown only in FIG. 6) is formed on each of the lateral edges of the inner peripheral openings 71b. The projection 71c projects radially outward and extends vertically.

The outer peripheral water entry reducing portion 72 includes outer peripheral wall portions 72a, 72a, 72a, and outer peripheral openings 72b. The outer peripheral wall portions 72a, 72a, 72a surround the inner peripheral wall portions 71a, 71a, 71a outside the inner peripheral wall portions 71a, 71a, 71a, and substantially prevents water inside the blowing casing 8 from entering the motor 60. The outer peripheral openings are each formed between an associated adjacent pair of the outer peripheral wall portions 72a. Each outer peripheral wall portion 72a extends in an arc shape around the output shaft 61, and its curvature is larger than the curvature of the inner peripheral wall portions 71a, 71a, 71a. As shown in FIG. 3, the outer peripheral wall portions 72a, 72a, and 72a extend to below the lower ends of the inner peripheral wall portions 71a, 71a, and 71a. The protrusion 63c of the cover 63 of the motor 60 is fitted inside the outer peripheral wall portions 72a, 72a, and 72a.

The total number of the outer peripheral openings 72b is three. Each inner peripheral opening 71b is formed in the shape of a slit elongated vertically, and has an upper end flush with the upper ends of the inner peripheral wall portions 71a. Each outer peripheral opening 72b has a lower end located near and above the lower end of an associated one of the inner peripheral wall portions 71a.

The outer peripheral openings 72b, 72b, and 72b are spaced apart from each other in the circumferential direction of the output shaft 61. The outer peripheral openings 72b are determined to have substantially the same width as the inner peripheral openings 71b, but may have a width different from that of the inner peripheral openings 71b. The inner peripheral openings 71b and the outer peripheral openings 72b are arranged so as not to overlap with one another in the circumferential direction of the output shaft 61 of the motor 60. Specifically, when the outer peripheral water entry reducing portion 72 is viewed from outside in the radial direction, the inner peripheral openings 71b and the outer peripheral openings 72b are arranged so that the outer peripheral openings 72b do not overlap with the inner peripheral openings 71b throughout the outer peripheral water entry reducing portion 72 in the circumferential direction thereof. Thus, the inner peripheral wall portions 71a are located radially inward of the outer peripheral openings 72b, and the outer peripheral wall portions 72a are located radially outward of the inner peripheral openings 71b.

The number of the inner peripheral wall portions 71a, the number of the inner peripheral openings 71b, the number of the outer peripheral wall portions 72a, and the number of the outer peripheral openings 72b should not be limited to the number described above, but may be less than or equal to two, or greater than or equal to four. The inner peripheral openings 71b and the outer peripheral openings 72b do not have to be configured as slits, and merely need to each have a shape and an area which allow air to radially flow therethrough.

The water entry reducing member 70 includes a lower wall portion 75 that connects lower portions of the inner peripheral wall portions 71a and lower portions of the outer peripheral wall portions 72a together. The lower wall portion 75 extends from the lower ends of the inner peripheral wall portions 71a to portions of the outer peripheral wall portions 72a above the lower ends thereof in the vicinity of the lower ends of the outer peripheral wall portions 72a. The lower wall portion 75 is inclined downward toward the outside of the output shaft 61 of the motor 60 in the radial direction. The inclination of the lower wall portion 75 is set such that if water accumulates on the lower wall portion 75, the water flows radially outward on the upper surface of the lower wall portion 75. The lower ends of the outer peripheral openings 72b reach the lower portions of the outer peripheral wall portions 72a (specifically, the upper surface of the lower wall portion 75).

The bell mouth portion 73 is provided outside the outer peripheral wall portions 72a, and is used to form an air inlet 73a of the lower blower fan 50. The air inlet 73a is circular, and is positioned concentrically with the upper bell mouth portion 73. The bell mouth portion 73 is integrated with the inner peripheral wall portions 71a, the outer peripheral wall portions 72a, and the lower wall portion 75.

A fixing groove (a fixing portion) 73b is provided on an outer portion of the bell mouth portion 73 so as to be fixed to the blowing casing 8. The fixing groove 73b opens upward and extends in an annular shape. A ring-shaped portion 8d is fitted into the fixing groove 73b to protrude downward inside the blowing casing 8. As a result, the outer portion of the bell mouth portion 73 is fixed inside the blowing casing 8.

An upper portion of each outer peripheral wall portion 72a is provided with an arm-like connector 76 extending radially outward. Radially outer end portions of the connectors 76 are continuous with an inner portion of the bell mouth portion 73, and the bell mouth portion 73 and the outer peripheral wall portions 72a are integrated together with the connectors 76 interposed therebetween. Air can flow through a space between each circumferentially adjacent pair of the connectors 76, 76.

Figure 6:
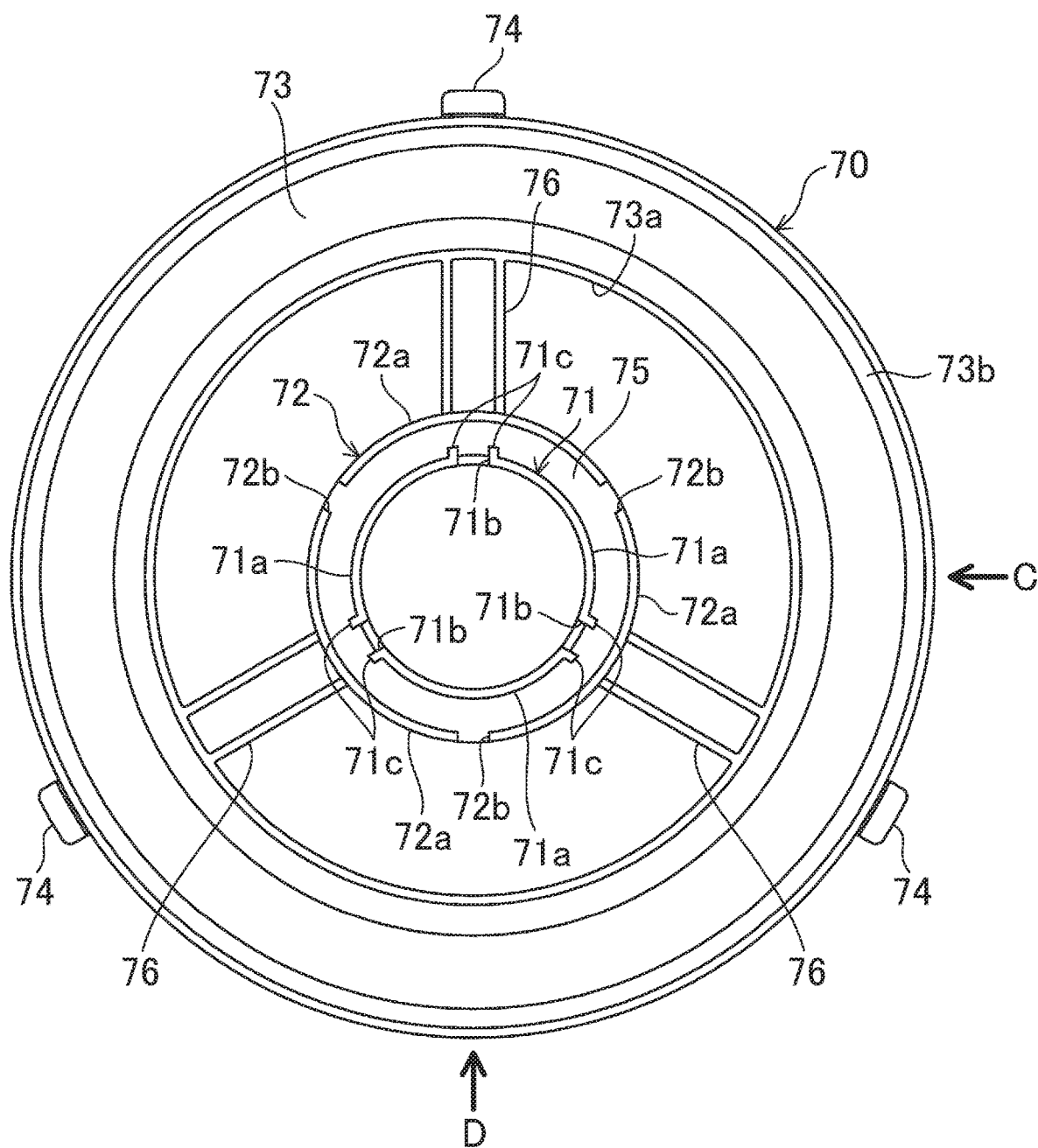
FIG. 6 is a plan view of the water entry reducing member.
Figure 7:
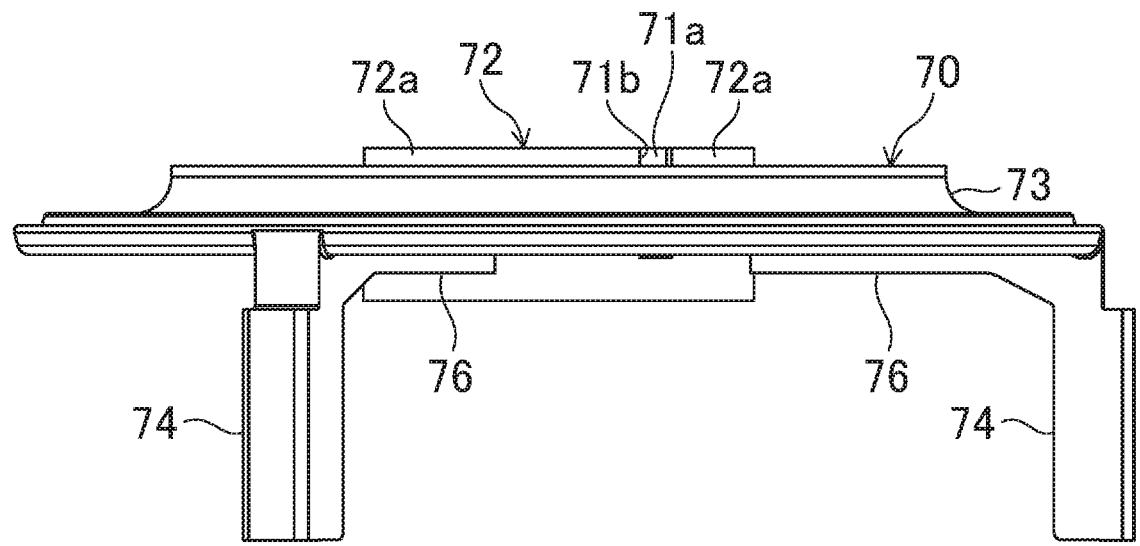
FIG. 7 is a view as viewed in the direction indicated by the arrow C shown in FIG. 6.
Figure 8:
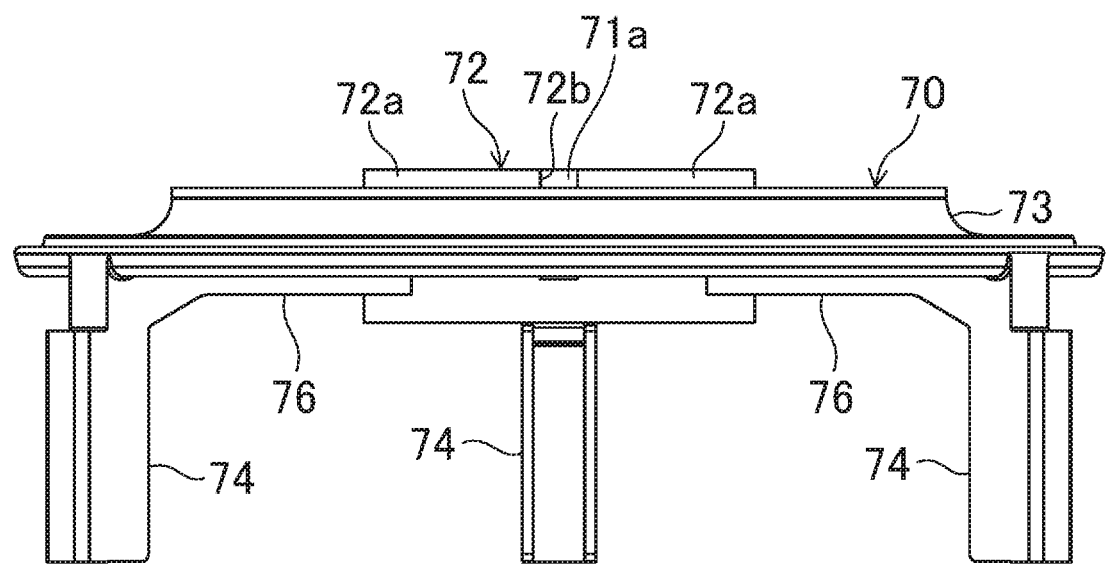
FIG. 8 is a view as viewed in the direction indicated by the arrow D shown in FIG. 6.

As shown in FIGS. 4, 6, and other figures, an outer portion of the bell mouth portion 73 is provided with the support leg portions 74, 74, 74 supported by the motor 60. The support leg portions 74, 74, 74 are spaced apart from one another in the circumferential direction, extend downward from the lower surface of the bell mouth portion 73, and each have a lower end, which abuts against the upper surface 62a of the body 62 of the motor 60 and is supported by the upper surface 62a from below. The upper end of each support leg portion 74 is integrated with the radially outer end portion of an associated one of the connectors 76. This can increase the support stiffness.

Advantages of Embodiment

Next, advantages of the embodiment will be described. If the vehicle air-conditioning air blower 1 operates in the outside-air introduction mode or the inside/outside-air double flow mode, the outside air inlet 9 is opened. Thus, for example, rainwater or water used to wash the vehicle may enter the interior of the blowing casing 8 through the outside air inlet 9. Water that has entered the interior of the blowing casing 8 may flow downward through the lower air passage 18 to reach the upper surface 62a of the body 62 of the motor 60, and may flow and scatter toward the air inlet 73a of the bell mouth portion 73 together with the air flow at this time.

Specifically, water that has entered the interior of the blowing casing 8 may flow toward the output shaft 61 of the motor 60. In this embodiment, the inner peripheral wall portions 71a of the inner peripheral water entry reducing portion 71 and the outer peripheral wall portions 72a of the outer peripheral water entry reducing portion 72 surround the output shaft 61. Thus, at least the overlapping wall portions 71a, 72a surround the output shaft 61. This substantially prevents water flowing toward the vicinity of the output shaft 61 from entering the interior of the motor 60 through the upper portion of the cover 63.

On the other hand, since the inner peripheral water entry reducing portion 71 has the inner peripheral openings 71b, and the outer peripheral water entry reducing portion 72 has the outer peripheral openings 72b, air flows through the outer peripheral openings 72b and the inner peripheral openings 71b, and reaches the vicinity of the output shaft 61. This allows cooling air to be supplied to the motor 60. At this time, water may join the flow of the air. However, the inner peripheral openings 71b and the outer peripheral openings 72b do not overlap with one another in the circumferential direction of the output shaft 61. Thus, even if water passes through the outer peripheral openings 72b, the water then hits the inner peripheral wall portions 71a, and is less likely to reach the inner peripheral openings 71b. This substantially prevents water from entering the inside of the motor 60 through the upper portion of the cover 63.

The lower wall portion 75 that connects the lower portions of the inner peripheral wall portions 71a and the lower portions of the outer peripheral wall portions 72a together is inclined downward toward the outside of the output shaft 61 in the radial direction, and the outer peripheral openings 72b reach the upper surface of the lower wall portion 75. Thus, if water enters a space between the inner peripheral wall portions 71a and the outer peripheral wall portions 72a, the water can be drained through the outer peripheral openings 72b.

In a state where the water entry reducing member 70 is inserted into the blowing casing 8, the protrusion 63c of the cover 63 of the motor 60 is fitted inside the outer peripheral wall portions 72a, 72a, 72a of the water entry reducing member 70, and the ring-shaped portion 8d of the blowing casing 8 is fitted into the fixing groove 73b. Furthermore, the water entry reducing member 70 is supported on the motor 60 by the support leg portions 74. Thus, the water entry reducing member 70 is stabilized inside the blowing casing 8.

The inner peripheral wall portions 71a, the outer peripheral wall portions 72a, and the bell mouth portion 73 of the water entry reducing member 70 are integrated together. This reduces the number of parts to reduce the number of assembling steps, and prevents the inner peripheral wall portions 71a, the outer peripheral wall portions 72a, and the bell mouth portion 73 from being relatively misaligned, thus improving the assembling accuracy.

In the foregoing embodiment, the present invention is applied to the semi-center unit in which the vehicle air-conditioning air blower 1 is disposed in front of a passenger seat. However, this is only an exemplary embodiment of the present invention. For example, the present invention is applicable to a full-center unit in which the vehicle air-conditioning air blower 1 is disposed in a laterally central portion of a vehicle.

Alternatively, the vehicle air-conditioning air blower 1 and an air conditioning unit may be integrated together.

The embodiments described above are mere examples in every respect, and shall not be interpreted in a limited manner. Variations and modifications of equivalents of the claims are all intended to fall within the scope of the present disclosure.

As can be seen from the foregoing description, a vehicle air-conditioning air blower according to the present invention may be used, for example, as an air blower unit for a vehicle air conditioner.

What is claimed is:

1. A vehicle air-conditioning air blower comprising:
   a casing having an inside air inlet through which air inside a cabin is introduced into the casing, and an outside air inlet through which air outside the cabin is introduced into the casing, the inside air inlet and the outside air inlet opening to outside, the casing further having a first air passage and a second air passage each communicating with both of the inside air inlet and the outside air inlet, the casing including an inside/outside air switching damper that opens and closes the inside air inlet and the outside air inlet;
   a first blower fan disposed in the first air passage;
   a second blower fan disposed in the second air passage; and
   a motor including an output shaft transmitting torque to the first and second blower fans, the first blower fan sending air in the first air passage as air-conditioning air, the second blower fan sending air in the second air passage as air-conditioning air, wherein
   the first and second blower fans and the output shaft are arranged so that their rotation axes extend vertically,
   the first blower fan is disposed above the second blower fan,
   the motor is disposed below the second blower fan,
   the casing includes therein an inner peripheral water entry reducing portion including an inner peripheral wall portion, an outer peripheral water entry reducing portion including an outer peripheral wall portion, and a lower wall portion, the inner peripheral wall portion surrounding the output shaft and substantially preventing water inside the casing from entering the motor, the outer peripheral wall portion surrounding the inner peripheral wall portion outside the inner peripheral wall portion and substantially preventing water inside the casing from entering the motor, the lower wall portion connecting a lower portion of the inner peripheral wall portion and a lower portion of the outer peripheral wall portion together,
   the inner peripheral water entry reducing portion has at least one inner peripheral opening through which air flows,
   the outer peripheral water entry reducing portion has at least one outer peripheral opening through which air flows,
   the at least one inner peripheral opening and the at least one outer peripheral opening are prevented from overlapping with each other in a circumferential direction of the output shaft
   the lower wall portion is inclined downward toward outside in a radial direction of the output shaft,
   the at least one outer peripheral opening reaches a lower end of the outer peripheral wall portion,
   an annular bell mouth portion having an air inlet for the second blower fan is provided outside the outer peripheral wall portion,
   the inner peripheral wall portion, the outer peripheral wall portion, and the bell mouth portion are integrated together, and
   a support leg portion supported by the motor is provided on an outer portion of the bell mouth portion.

2. The vehicle air-conditioning air blower of claim 1, wherein
   the at least inner peripheral opening and the at least one outer peripheral opening are each configured as a slit extending vertically, the at least one inner peripheral opening comprises a plurality of inner peripheral openings, the at least one outer peripheral opening comprises a plurality of outer peripheral openings, the inner peripheral openings are spaced apart from each other in the circumferential direction of the output shaft, and the outer peripheral openings are spaced apart from each other in the circumferential direction of the output shaft.

3. The vehicle air-conditioning air blower of claim 1, wherein
   a fixing portion fixed to the casing is provided on an outer portion of the bell mouth portion.

* * * * *